United States Patent [19]
Holland-Letz et al.

[11] 3,987,880
[45] Oct. 26, 1976

[54] WRAP AROUND SPRING CLUTCH

[75] Inventors: Gunter Holland-Letz; Hermann Kohlhage, both of Paderborn, Germany

[73] Assignee: Nixdorf Computer AG, Paderborn, Germany

[22] Filed: Apr. 23, 1975

[21] Appl. No.: 570,770

[30] Foreign Application Priority Data
Apr. 24, 1974 Germany .............................. 2419848

[52] U.S. Cl. ............................ 192/12 BA; 192/26; 192/36
[51] Int. Cl.² .................. F16D 41/02; F16D 41/20; F16D 67/02
[58] Field of Search .............. 192/12 BA, 26, 35, 36

[56] References Cited
UNITED STATES PATENTS

| | | |
|---|---|---|
| 3,376,963 | 4/1968 | Schaefer .......................... 192/12 BA |
| 3,425,526 | 2/1969 | Baer ................................ 192/12 BA |
| 3,559,781 | 2/1971 | Brunelle .......................... 192/12 BA |
| 3,648,810 | 3/1972 | Weatherby............................ 192/26 |
| 3,797,618 | 3/1974 | Peterson.......................... 192/12 BA |
| 3,876,184 | 4/1975 | Eudy ........................... 192/12 BA X |

*Primary Examiner*—Allan D. Herrmann
*Attorney, Agent, or Firm*—Gifford, Chandler & Sheridan

[57] ABSTRACT

A spring clutch for a step drive, such as for form feeds in office machines, comprising drive and driven hubs rotatable about a common axis and having respective axially adjacent parts surrounded by a coil torsion spring which, in an unstressed condition, has a diameter greater than that of the hub parts, the spring having one end anchored for rotation with the drive hub, and the other end coupled to a clutch actuating member through the intermediary of a slip clutch mechanism having a slip torque which is greater than the torque required to wind the coil torsion spring onto the hub parts.

7 Claims, 3 Drawing Figures

WRAP AROUND SPRING CLUTCH

BACKGROUND OF THE INVENTION

I. Field of the Invention

This invention relates to a spring clutch for switch or step drives, such as for form feeds in office machines, having a wrap-around coil spring coupled for rotation with a drive hub, and having an unstressed diameter which is greater than the diameters of both the drive hub and a driven hub.

II. Description of the Prior Art

There are two basic constructions for clutches in form feeds or the like to provide positive connection between the spring and the driven and the drive hubs and commonly sold. In one case the unstressed diameter of the spring is smaller than the diameter of the clutch hub. The free end of the spring is held stressed by a releasable catch, the spring suddenly winding up around the rotating drive hub when the catch is released and, as a result of the friction, is rotated with the hub. For declutching, the free end of the spring again engages the catch, so that the spring can be unwound to its stressed, open position again, by inertia or spring action. In the second case the unstressed diameter of the spring is greater than the clutch hub. To engage the clutch, the free end of the spring is pressed against the stationary hub, for example by means of a guide shoe, so that the spring draws together and the two hubs are coupled.

Although these clutch constructions may operate satisfactorily in many applications, there are, however, also cases in which the requirements with regard to the operating accuracy are particularly high and in which only small control forces are available for actuating the clutch. Such applications arise for example, in office machines in which record supports must be conveyed line by line and each line space has to be reproducible as accurately as possible. Accurate clutch actions are also required in other fields, for example in conveyor systems in the manufacturing industry and in sorting equipment.

The known spring clutches have the disadvantage that their switching position is largely determined by the time and the duration of the control force. Moreover, the duration of the controlling force is usually not the same as the duration for which the clutch is engaged, so that relatively great inaccuracies are introduced by this fact alone. In order to reach a pre-determined objective after declutching, a high motor force is therefore usually required so that the clutch still achieves its objective even when the drive is already interrupted. It has to be recognized that such restrictions have a direct influence on the operating accuracy and the inaccuracies introduced can possibly be additive.

SUMMARY OF THE PRESENT INVENTION

The present invention aims at avoiding these disadvantages and accordingly provides a spring clutch for a step drive, such as for form feeds in office machines, comprising drive and driven hubs rotatable about a common axis and having respective axially adjacent parts surrounded by a coil torsion spring which, in an unstressed condition, has a diameter greater than that of the hub parts, the spring having one end anchored for rotation with the drive hub, and the other end coupled to a clutch actuating member through the intermediary of a slip clutch mechanism having a slip torque which is greater than the torque required to wind up the coil torsion spring onto the hub parts.

With this construction it is possible to obtain a positive transmission of power during the entire period for which the clutch is in the engaged state and, in particular, predetermined switch-off points can be reached with high switching precision. In addition, only low control forces may be necessary and there may be no dependence on the duration of these forces.

The full coupling force can be transmitted accurately up to the time at which the controlling force is removed by the actuating element. In this way it is possible to reach accurately predetermined end points without the controlling force having to be removed previously and thus producing great inaccuracies. Since the slip torque of the slip clutch is greater than the torque required to draw the wrap-around spring together, the total arrangement can be freely rotated in the declutched state and the clutch is engaged practically immediately when the coupling to the actuating element is completed. This actuating element can, very simply by an element arranged in a stationary manner, which prevents the rotation of the slip clutch at its output side and thus reliably produces the required difference between the slip torque and the torque necessary for winding up the spring.

The instantaneous declutching of the clutch takes place precisely when the coupling of the actuating element is interrupted because the difference in torque is then eliminated and the restoring force of the torsion spring is immediately effective to unwind the spring. It can thus be seen that the time at which the force is transmitted via this clutch is exactly the same as the time at which the actuating element is activated and thus the switching precision is substantially increased compared with clutches known hitherto. Since the actuating element can be anchored in a stationary manner, only the small actuating force with which the element is required to exert on the slip clutch must be applied to operate the clutch.

In a preferred embodiment of the invention, the slip clutch can have two concentric sleeve elements surrounding the spring, which elements are axially loaded by a compression spring acting between them. This has the advantage of the spring being totally enclosed and thus protected against contamination. This is particularly important in office machines.

The sleeve elements can consist of plastic material, which has a coefficient of friction suitable for producing the necessary slip torque. A contribution to this slip torque is also made by the compression spring between the two sleeve elements and by means of which it is possible to increase the slip torque to a value greater than the torque required for winding up the spring.

One of the sleeve elements may be provided with several radial slots for the adjustable retention of the free end of the spring. When the sleeve element surrounds the spring, the free end can be positioned by location in an appropriate slot so accurately that a minimum rotary travel is required to wind up the spring. This gives a further improvement in the operating accuracy.

The sleeve element which is not connected to the free end of the coil spring may have a toothed flange with which the actuating element can cooperate. In this way several coupling operations can be carried out, during a single revolution of the clutch, the minimum interval between these operations being determined by the number of teeth on the flange. It has been found that very small switching steps can be effected by the clutch due to its high switching rate and switching precision.

Since the preferred form of clutch operates very accurately as described, control elements, interconnected with each other can be arranged to engage the drive side and the driven side respectively. For this purpose the clutch may include a stop wheel on its driven hub for stopping the hub in predetermined angular positions when the clutch is disengaged. The driven side can thus be utilized to provide stop mechanism which can be brought into action with the drive side for each stop position, independently of the time at which the clutch is actuated. This will allow the clutch to be used in office machines for a line spacing system which operates very accurately.

The driven hub may be provided with a return stop so that no vibrational or reciprocal motion of the driven hub can occur in the range of movement between adjacent stop positions of the stop wheel. This return stop can be a coil torsion spring which surrounds the driven hub with its ends fixed in position, and which can be easily adjusted and so accurately that its frictional resistance occurs within the range of movement bewteen adjacent stop points of the stop wheel.

The clutch can be controlled electromagnetically by a device which has a stop element cooperable with the stop wheel and which is engaged with the wheel when no current flows in the electromagnet. The stop element is movable by the stop wheel to move the actuating element out of the range of the toothed flange.

Thus, when the electromagnet current is switched off, the stop element, after passing through one stop point, removes the actuating element from the slip clutch, which in turn ensures that the clutch is promptly declutched at precisely this point in time.

DESCRIPTION OF THE DRAWINGS

The preferred embodiment of the invention is described in detail below by way of example with reference to the accompanying drawings, in which.

DESCRIPTION OF THE PREFERRED EMBODIMENT

Figure 1:
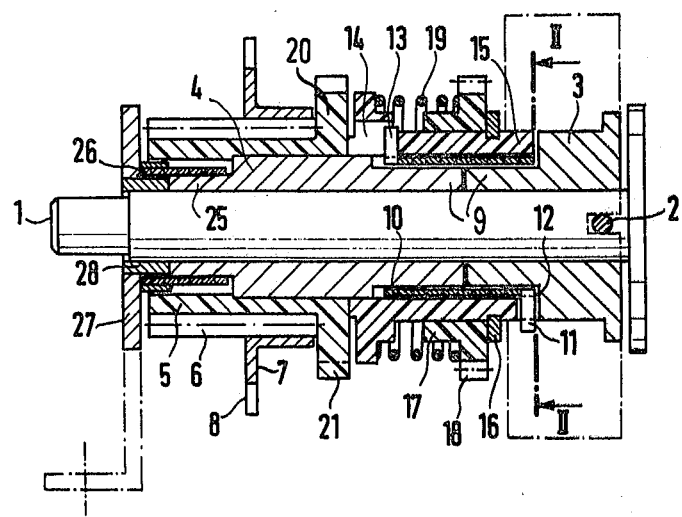
FIG. 1 is an axial cross section through a spring clutch according to the invention.

As shown in FIG. 1, the clutch parts sit on a drive shaft 1, which is connected to a drive hub 3 by means of a pin 2 so that the drive hub 3 rotates together with the drive shaft 1. A driven hub 4 is also arranged, in a freely rotatable manner, on the drive shaft 1. The driven hub 4 is rigidly connected to a driven pinion 5 which is made of plastic and has teeth 6. A slotted disc 7, the slots 8 of which pass an opto-electronic control (not shown) for producing control signals for a device driven through the clutch in a known manner, can also be fixed to the driven pinion 5.

The drive hub 3 and the driven hub 4 are provided with coinciding parts 9 of reduced diameter around which a coil torsion, leaf spring 10 is arranged. This spring 10 has ends 11 and 13 which are bent radially outwards. The end 11 of the spring is anchored in a slot 12 in the drive hub 3, that is to say has a positive rotary connection with this hub. A control force is applied from outside, in a manner which is yet to be described, to the free end 13 of the spring to wind the spring up onto hub parts 9.

FIG. 1 also shows, by dot-and-dash lines, an enlargement of the drive hub 3, which is intended to indicate that the drive of the clutch could alternatively be effected at this point, for example by means of a belt trained around the hub.

The spring 10 is surrounded by a plastic sleeve 15 which protects it against the ingress of contaminants. Together with a further plastic sleeve 17 which sits on top of it, the plastic sleeve 15 forms a slip clutch. The two plastic sleeve 15 and 17 are urged apart by a compression spring located between flanges at the ends of the sleeves. The plastic sleeve 17 lies against a Seeger circlip ring 16, so that the two elements of the slip clutch are provided with a pre-load. Since the Seeger circlip ring 16 is anchored in the inner plastics sleeve 15, a slip torque between the two sleeves, which is greater than the torque required to wind up the spring 10 is ensured by the spring 19.

It can also be seen in FIG. 1 that the plastic pinion 5 is provided with a flange 20, which forms a stop wheel having teeth 21. The function of this stop wheel will be described further below.

A return stop is provided at the left-hand end of the driven hub for avoiding rotation of pinion 5 in the opposite direction to that in which it is driven. For this purpose the diameter of the driven hub is reduced at 25 so that, between the plastic pinion 5 and the driven hub 4, a cavity is formed in which a coil torsion spring 26, which blocks the return movement is located. This spring 26 is fastened to a sleeve element 28 which has a flange 27 fastened in a stationary manner to the frame supporting the clutch. This stationary mounting is indicated by dot-and-dash lines in FIG. 1.

Figure 2:
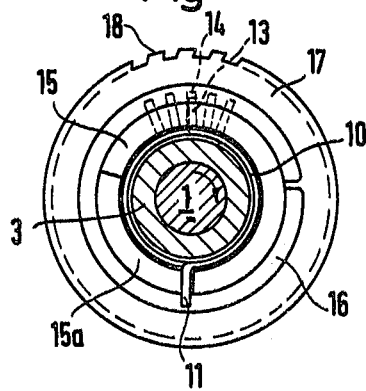
FIG. 2 is a section taken along the line II-II of FIG. 1.

FIG. 2 shows the section II-II from FIG. 1. The concentric arrangement of the drive shaft 1, the drive hub 3 and the wrap-around spring 10 can be seen. The two bent ends 11 and 13 of the spring 10 are shown in their respective anchored positions. It can be seen that the free end 13 of the wrap around spring 10 can be accommodated in any one of several slots 14 in the inner sleeve element 15 so that the position of the wrap around spring 10 is adjustable. The slots 14 are shown in broken line in FIG. 2. The end 11 of the spring 10 which is located in the slot 12 (FIG. 1) of the drive hub 3 can be moved together with the drive hub 3 relative to the sleeve 15 through an angle of rotation which is determined by the length of cutout 15a, which is provided in the inner sleeve 15. This cutout 15a makes it possible for the anchored end 11 of the spring to move to wind up the spring. However, due to the fineness of the possible adjustment of the spring provided by slots 14, this movement is so small that in practice only a fraction of the length of the cutout 15a is taken up in winding up the spring.

FIG. 2 also shows the toothed flange 18 of the outer sleeve element 17. The Seeger circlip ring 16, which has already been described and which holds the two sleeve elements 15 and 17 together against the force of the compression spring 19, abuts against the sleeve 17 or on its flange 18, so that the required slip torque of the slip clutch thus formed is produced.

The operation of the spring clutch is such that engaging the clutch requires only the action of a force on the toothing 18 of the outer sleeve element 17 sufficiently large to stop this sleeve 17 rotating with the inner sleeve element 15. When the drive shaft 1 is driven continuously, initially the drive hub 3 rotates and with it also the spring and the slip clutch, which is formed by the two sleeve elements 15 and 17. This rotation takes place in the direction of the arrow shown in FIG. 2. The driven hub 4 is freely rotatable in the same direction. The wrap around spring is unstressed and is spaced from both the drive hub 3 and the driven hub 4. Since the sleeve 15 is coupled for rotation with the spring 10, the entire slip clutch is rotated. The spring 10 rotates the sleeve 15 because its end 13 sits in a slot 14 in the inner sleeve element 15.

If the rotation of the outer sleeve element 17 is now impeded by an activating element engaging its toothed flange 18, the slip torque of the slip clutch slows rotation of the sleeve 15 and the end 11 of the spring is carried along by the drive hub 3 relative to the now stationary sleeve 17 in such a way that the spring moves in the cutout 15a and wraps the spring around the two parts 9 of the hubs 3 and 4 and to effect rotary coupling. The sleeve 15 rotates with the hubs and the only stationary part of the arrangement is thus the outer sleeve 17.

The clutch is instantaneously released from the engaged state as soon as the impeding force is removed from the outer sleeve element 17. Since the slip clutch is then engaged again to a certain extent, the coil spring 10 can immediately unwind to the extent by which its end 11 had been advanced along the cutout 15a. This results in a declutching process which practically coincides with the moment in time at which the inhibiting force is removed from the outer sleeve element 17.

Thus, to achieve a predetermined end position in which declutching is effected, the wrap-around spring clutch described does not have to be controlled in a complicated manner; on the contrary, any desired end position can be achieved without difficulty by simply removing the control force. The control force required is very small and can easily be produced by a catch, which is supported in a stationary manner for engagement with the teeth 18.

Figure 3:
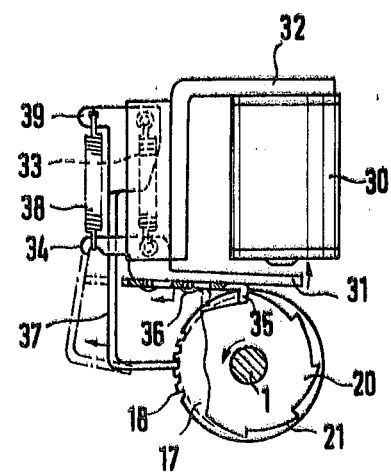
FIG. 3 is a schematic representation of a control device for a spring clutch according to the invention.

As has already been described, due to its advantageous operating characteristics, the spring clutch can be controlled by interaction between the drive side and the driven side, which is particularly advantageous for use in step drives, for example in form feeds in office machines. FIG. 3 shows an actuating device which makes control of this type possible. An electromagnet 30 and the toothed flange 18 of the outer sleeve element 17 and the stop wheel 20 with the stops 21 sitting on the drive shaft 1 are shown schematically. The electromagnet 30 has an armature 31 and a support member 32, which is mounted, in a manner which is not shown, on a frame which also supports the clutch. The armature 31 is held in the rest position shown by tension spring 33 and when the electromagnet 30 is switched on, is moved towards the core of the magnet in accordance with the direction of the arrow shown. The armature 31 is also provided with a stop element 35, which is slidably secured to it by pins 36. The stop element 35 can be moved relative to the armature, in the direction of the arrow shown by the action of the stop wheel 20. It then acts on a catch 37, which, in the rest position, is held in engagement with the teeth 18 of the outer sleeve 17 by a tension spring 38. The spring 38 is arranged between two projections 34 and 39 so that it urges the catch 37, which is connected to the suspension 39, against the toothing 18. When the electromagnet 30 is switched off, the movable stop 35 moves the catch 37 out of the toothing 18 by the action of the rotating stop wheel 20, and the clutch is declutched. When the electromagnet 30 is switched on the armature is attracted towards the magnet and the stop element 35 is moved out of the path of the stop wheel 20. At this moment the catch 37 engages the teeth 18, which corresponds to the position shown by the solid line in FIG. 3, and the clutch is engaged. The position of the catch 37 when not engaged with the sleeve 17 is shown by a dot-and-dash line in FIG. 3.

With a device as shown in FIG. 3 it is possible to control the spring clutch in such a way that it carries out switching steps, the length of which depends on the toothing 21 of the stop wheel 20. There is no further dependence on the duration of the control impulses which are fed to the electromagnet 30. For the functioning of this arrangement is is important only that there be a control impulse, the length of which can vary within the length pre-determined by the stop wheel steps. The accuracy of the mode of action of the clutch is not impaired by this. Such control impulses can, for example, be supplied by an opto-electronic system combined with the slotted disc 7 as described in connection with FIG. 1; these impulses are also called timing pulses.

When the electromagnet 30 is switched on, the stop 35 is removed from the stop wheel 20, the catch 37 is placed in the teeth 18, and the clutch is engaged instantaneously. If the control impulse for the electromagnet 30 is removed immediately afterwards the electromagnet armature falls away and the clutch continues in the engaged state until the stop 35, which has now again moved into engagement with the stop wheel 20, is moved by the subsequent stop tooth, by means of the engaged clutch, to disengage the catch 37 from the teeth 18 and take up the position shown by the dot-and-dash line. This effects immediate declutching and the drive is stopped. Thus, the spring clutch is operated for a longer or shorter period depending on whether a control impulse for the electromagnet 30 is shorter or longer than the time taken for the stop wheel to rotate through the angle defined between adjacent stops. However, it is ensured in each case that the clutch is declutched at precisely predetermined points, which, for example, when used in step conveyor devices which operate line by line, can produce the precise spacing of preset lines on forms.

Thus, in contrast to the friction clutches customary hitherto, the operation of which is always dependent on the duration of the control impulses supplied to them, the actuating device shown in FIG. 3 ensures accurate stepwise operation independently of the duration of the control impulses. This is achieved by the described interaction between the drive side and the driven side of the clutch. However, with an actuating device according to FIG. 3 a flutter phenomenon can occur during a condition in which the stop wheel 20 is just not engaging the stop 35, but in which the electromagnet 30 is switched off, since, in the declutched state, the driven pinion 5 (FIG. 1) can be freely rotated together with the stop wheel 20. In order to prevent such undefined states or forward or backward movements of the driven pinion 5, the return stop mechanism already described is provided and reliably ensures that the driven pinion 5 can be rotated only in the preset driven direction. This improves the operating reliability of the spring clutch.

We claim:

1. A spring clutch for a step drive, such as for form feeds in office machines, comprising drive and driven hubs rotatable about a common axis and having respective axially adjacent parts surrounded by a coil torsion spring which, in an unstressed condition, has a diameter greater than that of the hub parts, the spring having one end anchored for rotation with the drive hub, and the other end coupled to a clutch actuating member through the intermediary of a slip clutch mechanism having a slip torque which is greater than the torque required to wind up the coil torsion spring onto the hub parts said slip clutch mechanism comprising two concentric sleeve elements surrounding the spring which elements are frictionally coupled by a pre-loaded compression spring acting therebetween.

2. A spring clutch according to claim 1, wherein one of the sleeve elements is provided with several radially extending recesses, the said other end of the spring being removably located in one of the slots.

3. A spring clutch according to claim 1 wherein one sleeve element is connected to the said other end of the torsion spring and the other sleeve element has a toothed flange with which the actuating element can cooperate.

4. A spring clutch according to claim 1, wherein the driven hub carries a stop wheel for rotation therewith, for use in stopping the driven hub in predetermined angular positions when the clutch is disengaged.

5. A spring clutch according to claim 4, wherein an electromagnetically controlled actuating device is provided, which device has a stop element which is engageable with the stop wheel and an actuating element which moves out of engagement with a toothed flange on one of said sleeve elements when the electromagnet is de-energized.

6. A spring clutch according to claim 1, wherein the driven hub is provided with a return stop mechanism for preventing rotation of the driven hub when the clutch is disengaged.

7. A spring clutch according to claim 6, wherein the return stop mechanism includes a coil torsion spring which surrounds the driven hub and is held against rotation.

* * * * *